US011797978B1

(12) United States Patent
Yee et al.

(10) Patent No.: US 11,797,978 B1
(45) Date of Patent: Oct. 24, 2023

(54) ORIENTATIONLESS TRANSACTION CARD

(71) Applicant: Capital One Services, LLC, McLean, VA (US)

(72) Inventors: Bryant Yee, Silver Spring, MD (US); Tyler Maiman, Melville, NY (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/706,767

(22) Filed: Mar. 29, 2022

(51) Int. Cl.
*G06Q 20/34* (2012.01)
*G06Q 20/32* (2012.01)

(52) U.S. Cl.
CPC ....... *G06Q 20/341* (2013.01); *G06Q 20/3278* (2013.01); *G06Q 20/357* (2013.01)

(58) Field of Classification Search
CPC .................................................. G06Q 20/341
USPC ........................................................ 235/380
See application file for complete search history.

(56) References Cited

U.S. PATENT DOCUMENTS

| | | | |
|---|---|---|---|
| 9,965,716 B2* | 5/2018 | Stern | B32B 37/185 |
| 10,748,369 B1 | 8/2020 | Nakhare et al. | |
| 11,010,652 B2 | 5/2021 | Maiman et al. | |
| 11,062,195 B2 | 7/2021 | Mullen et al. | |
| 11,068,770 B2 | 7/2021 | Finn et al. | |
| 2021/0103919 A1 | 4/2021 | Mullen | |
| 2021/0400811 A1* | 12/2021 | Ma | H05K 1/181 |

* cited by examiner

*Primary Examiner* — Rafferty D Kelly
(74) *Attorney, Agent, or Firm* — Sterne, Kessler, Goldstein & Fox P.L.L.C.

(57) ABSTRACT

A transaction card is provided. The transaction card can include a top layer, a first intermediate layer, a middle layer, a second intermediate layer, and a bottom layer. Contact pads can be disposed in the top layer and bottom layer and can be electrically connected to each other via the first intermediate layer, the second intermediate layer, and the middle layer to provide an electrical connection to the same chip. At least one of the contact pads can be coupled to an integrated chip disposed between the top layer and the bottom layer.

18 Claims, 11 Drawing Sheets

ORIENTATIONLESS TRANSACTION CARD

FIELD

The present disclosure relates to a transaction card for use with a card reader. In particular, a transaction card that can be read by a card reader in multiple orientations.

BACKGROUND

Transaction cards, such as credit cards and debit cards, are convenient tools for providing payment for goods and services. Europay, MasterCard and Visa (EMV) transaction cards can store a user's account data in embedded integrated circuit (IC) chips and/or magnetic stripes. Payment terminals can be capable of physically receiving these transaction cards to read the stored account data and process payments.

BRIEF SUMMARY

Aspects provide a transaction card. The transaction card can include a top layer; a bottom layer; a first intermediate layer disposed under the top layer; a second intermediate layer disposed above the bottom layer; a middle layer disposed between the first intermediate layer and the second intermediate layer; a first contact pad disposed in the top layer; and a second contact pad disposed in the bottom layer. The second contact pad can be electrically connected to the first contact pad via the first intermediate layer, the second intermediate layer, and the middle layer. The transaction card can also include a chip having processing circuitry and a memory. The chip can be disposed between the top layer and the bottom layer and coupled to at least one of the first contact pad and the second contact pad such that the first contact pad and the second contact pad process account information stored in the memory to communicate with a card reader.

In some aspects, the first intermediate layer can include electrical tracing to electrically connect the first contact pad and the second contact pad. In some aspects, the second intermediate layer can include electrical tracing to electrically connect the first contact pad and the second contact pad. In some aspects, the middle layer can include an electrical junction to electrically connect the first contact pad and the second contact pad. In some aspects, the first intermediate layer can include an antenna to electrically couple the chip to the first contact pad and the second contact pad. In some aspects, the second intermediate layer can include an antenna to electrically couple the chip to the first contact pad and the second contact pad. In some aspects, the middle layer can include an antenna to electrically couple the chip to the first contact pad and the second contact pad. In some aspects, the processing circuitry can detect which of the first contact pad and the second contact pad is coupled to the card reader. In some aspects, the processing circuitry can communicate with the card reader through the first contact pad or the second contact pad. In some aspects, the first intermediate layer can include an opening such that the first contact pad extends through the opening. In some aspects, the second intermediate layer can include an opening such that the first contact pad extends through the opening. In some aspects, the chip can be an EMV chip.

Aspects provide a transaction card having contact pads. The contact pads can include a first contact pad having electrical contacts and being disposed in a top layer of the transaction card and a second contact pad having electrical contacts and being disposed in a bottom layer of the transaction card. The transaction card can also include a chip having processing circuitry and a memory. The chip can be disposed between the top layer and the bottom layer and can be coupled to one of the contact pads such that each of the contact pads can be electrically connected to the other contact pads and can communicate account information stored in the memory to a card reader. The transaction card can also include a junction having junction points and disposed in a middle layer of the transaction card between the top layer and the bottom layer. The electrical contacts of each of the contact pads can be electrically connected to each other through the junction points such that each of the contact pads provide an electrical connection to the same chip.

In some aspects, the transaction card can also include electrical tracing in a first intermediate layer of the transaction card between the top layer and the middle layer; and electrical tracing in a second intermediate layer of the transaction card between the bottom layer and the middle layer. The electrical tracing in the first intermediate layer and the electrical tracing in the second intermediate layer can connect the contacts of the contact pads to the junction points. In some aspects, the transaction card can also include electrical tracing in an intermediate layer of the transaction card between the top layer and the middle layer. The electrical tracing can connect the contacts of the first contact pad and the second contact pad. In some aspects, the transaction card can also include electrical tracing in an intermediate layer of the transaction card between the bottom layer and the middle layer. The electrical tracing can connect the contacts of the first contact pad and the second contact pad. In some aspects, the processing circuitry can detect which of the contact pads are coupled to the card reader and communicates with the card reader through the contact pad coupled to the card reader. In some aspects, the transaction card can also include an antenna to couple the chip to the contact pads. In some aspects, the chip can be an EMV chip.

Aspects provide a method of manufacturing a transaction card. The method can include providing a top layer; providing a bottom layer; providing a first intermediate layer disposed under the top layer; providing a second intermediate layer disposed above the bottom layer; providing a middle layer disposed between the first intermediate layer and the second intermediate layer; disposing a first contact pad in the top layer; and disposing a second contact pad in the bottom layer. The second contact pad can be electrically connected to the first contact pad via the first intermediate layer, the second intermediate layer, and the middle layer. The method can also include disposing a chip between the top layer and the bottom layer. The chip can be coupled to at least one of the first contact pad and the second contact pad. The chip can include processing circuitry and a memory such that the first contact pad and the second contact pad process account information stored in the memory to communicate with a card reader.

BRIEF DESCRIPTION OF THE DRAWINGS

The accompanying drawings, which are incorporated herein and form part of the specification, illustrate aspects and, together with the description, further serve to explain the principles of the aspects and to enable a person skilled in the relevant art(s) to make and use the aspects.

DETAILED DESCRIPTION

The present invention(s) will now be described in detail with reference to aspects thereof as illustrated in the accompanying drawings. References to "one aspect," "an aspect," "an exemplary aspect," etc., indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The following examples are illustrative, but not limiting, of the present aspects. Other suitable modifications and adaptations of the variety of conditions and parameters normally encountered in the field, and which would be apparent to those skilled in the art, are within the spirit and scope of the disclosure.

As used herein, the terms "front" and "rear," "up" and "down," and "left" and "right," and the like are intended to assist in understanding of aspects of the invention with reference to the accompanying drawings with respect to the orientation of the transaction card as shown, and are not intended to be limiting to the scope of the invention or to limit the invention scope to the aspects depicted in the Figures. The directional terms are used for convenience of description and it is understood that a transaction card can be positioned in any of various orientations.

As used herein, the direction of a card can refer to which end or side of the card is read by a card reader, and the orientation of a card can refer to which surface of the card faces a card reader (e.g., top surface or bottom surface). Thus, as used herein, a transaction card that can be read by a card reader in any direction can refer to a card that can be read by a card reader leading with a first end or an opposing second end of the card. As used herein, a card that can be read by a card reader in any orientation can refer to a card that can be read by a card reader with a first or front surface of a card facing toward or away from a card reader (e.g. the card can be oriented with the first or front surface facing up or down).

A card reader, as used herein, can refer to a device that is capable of reading a magnetic stripe or an electronic chip of a transaction card, or that can communicate with an antenna of a transaction card, such as a near field communication (NFC) antenna. Card readers can also include a radio frequency identification (RFID) reader for reading RFID tags or smart labels, and can be capable of wireless communication, such as via Bluetooth or other short range communication protocol.

Aspects described herein relate to an orientationless transaction card having multiple contact pads so that the transaction card can be inserted into or swiped by a card reader in any direction or orientation. The card can include a single EMV chip connected to each contact pad to provide an electrical connection to the same chip and associate each contact pad with the same payment account. As a result, the consumer can avoid the step of determining how to properly align the card for use with a card reader and can simply swipe or insert the card irrespective of its direction or orientation.

Credit cards and other types of transaction cards, such as debit cards, automated teller machine (ATM) cards, gift cards, and the like are often used as a convenient alternative to cash or paper money for purchasing goods and services. Each card has different identifying information, such as a card number, expiration date, and security code and is associated with a specific payment account of the user.

An integrated chip, e.g., an EMV chip, can be associated with a payment account of a user. On the transaction card, the chip is electrically connected to a contact pad or can be integrally formed with a contact pad (e.g., the integrated chip can itself serve as a contact pad). When the transaction card is inserted into a card reader, the contact pad of the integrated chip (or the integrated chip itself) electrically connects to a contact pad of the card reader to allow the integrated chip to communicate with the card reader and transfer information stored on the integrated chip. Generally, a transaction card having an integrated chip must be inserted into a card reader in a particular manner, such as by inserting the transaction card into the card reader leading with the end of the card having the contact pad and with the contact pad facing up. Similar to cards having magnetic stripes, the consumer must properly orient the transaction card prior to inserting the card into the reader. Inserting the card in a different manner will result in a failed payment attempt as the card reader will not read the card. The user can then be required to insert the card again in a proper orientation.

Contact pads in the transaction card described herein can be positioned on the top surface and bottom surface of the card to facilitate additional permutations that the card can be inserted into a card reader. At least one contact pad can be provided. Additional contact pads can be provided to increase the number of permutations in which the card can be inserted into a card reader. In some aspects, four orientations are provided by facilitating access to two contact pads from the top surface and two contact pads from the bottom surface. By allowing any of the orientations to be inserted successfully in a card reader, the amount of time, effort, and attention required to achieve a successful payment is reduced. Users experience more seamless transactions as a result. Additionally, multiple orientations of the transaction card improves accessibility for those who are visually impaired and cannot easily distinguish the orientation of the card.

Multiple EMV chips can be disposed at various locations of a transaction card to provide multiple transactions orientations. However, EMV chips are expensive to produce and include in a single transaction card. Additionally, EMV chips disposed in a surface of a transaction card can be easily extracted such that a user's personal payment account data stored therein is vulnerable to theft. As described herein, a single EMV chip can be electrically connected to each contact pad to duplicate the user's account information at each contact pad (e.g., render each contact pad redundant). Using a single EMV chip reduces manufacturing costs. Electrical tracing and/or an antenna can be used to couple the EMV chip to a contact pad and the contact pads to one another, providing an electrical connection to the same chip. The card can be manufactured in multiple layers to allow the single EMV chip to be read in any orientation. According to aspects, each contact pad can be disposed in a top layer or a bottom layer. The EMV chip can be disposed behind one of the contact pads, with each contact pad being electrically connected to each other via the multiple layers. By disposing the EMV chip between the top layer and the bottom layer, the EMV chip can be secured within the card to reduce the risk of theft. The intermediate and middle layers can provide a central junction point to electrically connect the contact pads of the top layer and the bottom layer.

In addition, a user can have multiple transaction cards, each associated with a different payment account of the user. For example, the user can have a first transaction card associated with a credit account and a second transaction card associated with a bank account. Keeping and retrieving multiple transaction cards can be inconvenient and can result in one or more transaction cards, and therefore the payment accounts, being preferred for regular use, while other transaction cards are disregarded. Aspects also provide a transaction card with a second EMV chip associated with a different payment account. Accordingly, a user can have access to multiple of their payment accounts via a single transaction card.

Figure 1:
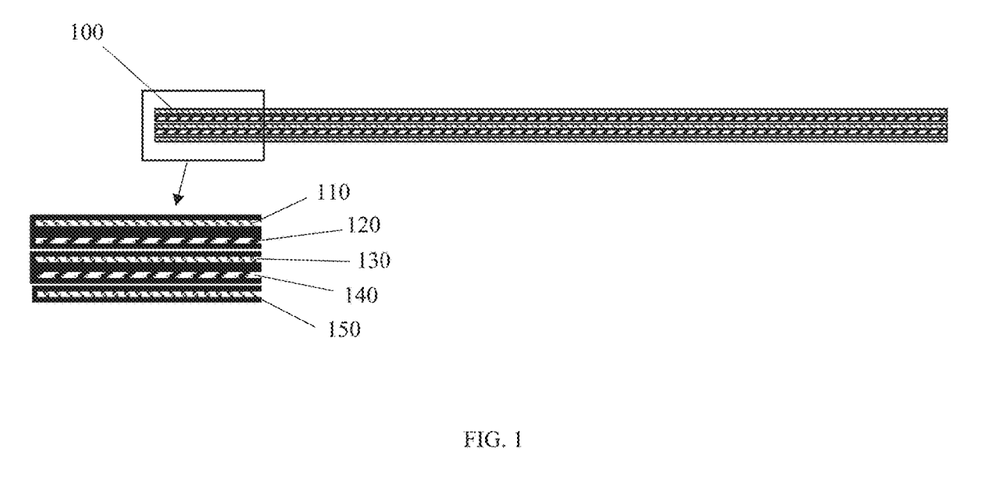
FIG. 1 shows a side view of a transaction card according to various aspects.

The transaction card described herein will now be discussed with reference to the drawings. A transaction card 100 is shown in FIG. 1. In some aspects, transaction card 100 can communicate personal information or account information to an external device (e.g., a card reader, smartphone, computer, etc.) electrically using EMV protocol and/or wirelessly using NFC protocol. In some aspects, transaction card 100 can be physically compliant with ISO/IEC 7810 ID-1 such that transaction card 100 has a length of approximately 85.60 mm (millimeters), a width of approximately 53.98 mm, and a thickness of approximately 0.76 mm. In some aspects, transaction card 100 can have a greater thickness. In some aspects, transaction card 100 can have rounded corners. In some aspects, transaction card 100 can be shaped as a polygon, such as a rectangle or square, or as a triangle, among various other shapes. In another aspect, transaction card 100 can have a curved shape.

Figure 2:
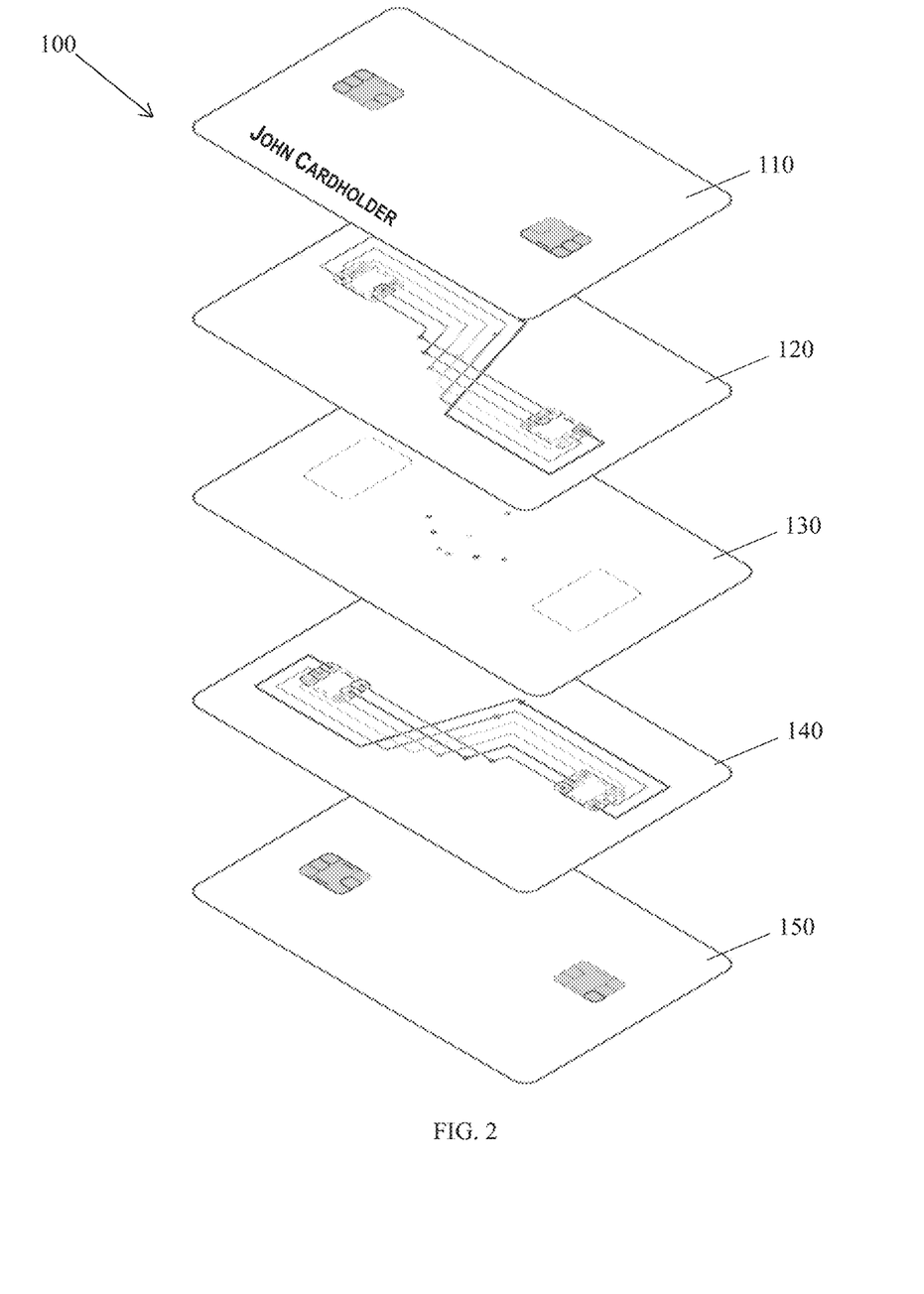
FIG. 2 shows an assembly view of the transaction card of FIG. 1.

Transaction card 100 can include one or more layers stacked on top of one another. In some aspects, transaction card 100 can include a top layer 110, a first intermediate layer 120, middle layer 130, a second intermediate layer 140, and a bottom layer 150. As shown in FIG. 2, first intermediate layer 120 can be disposed under top layer 110, second intermediate layer 140 can be disposed above bottom layer 150, and middle layer 130 can be disposed between first intermediate layer 120 and second intermediate layer 140. In some aspects, transaction card 100 can include additional intermediate layers between top layer 110 and bottom layer 150. Middle layer 130 can be the central junction point between top and bottom sides of transaction card 100 (e.g., between top layer 110 and bottom layer 150). In some aspects, one or more of top layer 110, first intermediate layer 120, middle layer 130, second intermediate layer 140, and bottom layer 150 can be laminated. Lamination can facilitate securing each of top layer 110, first intermediate layer 120, middle layer 130, second intermediate layer 140, and bottom layer 150 together. In some aspects, one or more of top layer 110, first intermediate layer 120, middle layer 130, second intermediate layer 140, and bottom layer 150 can include plastics (e.g., polycarbonate, high-density polyethylene, kydex thermoplastic, or acrylonitrile butadiene), metals (e.g., brass, copper, stainless steel, gold, palladium, or alloys thereof), and/or other materials (e.g., polyester).

Figure 3:
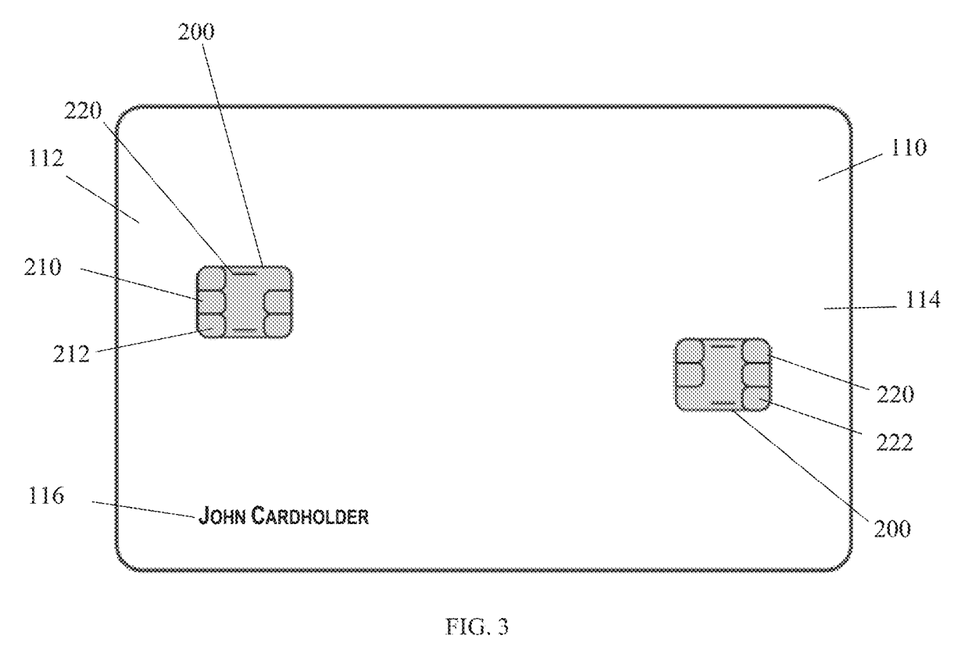
FIG. 3 shows a top view of the transaction card of FIG. 1.

One or more of top layer 110, first intermediate layer 120, middle layer 130, second intermediate layer 140, and bottom layer 150 can have components of transaction card 100. As shown in FIG. 3, top layer 110 can include a first side 112 and a second side 114 opposite first side 112. One or more contact pads 200 can be embedded within top layer 110, such as along first side 112 and/or second side 114. In some aspects, top layer 110 can include a first top contact pad 210 having contacts 212 and a second top contact pad 220 having contacts 222. First top contact pad 210 can be disposed along first side 112 and second top contact pad 220 can be disposed along second side 114. In some aspects, top layer 110 can include additional contact pads 200.

In some aspects, top layer 110 can include indicia 116. Indicia 116 can be applied to top layer 110 at a different location than the locations where first top contact pad 210 and second top contact pad 220 are disposed. Indicia 116 can be applied, for example, by printing, stamping, painting, coloring, or embossing, among other methods. Indicia 116 can include, for example, a name of the transaction card's owner, a logo or brand of the company that issued transaction card 100, a card number or account number, or a hologram, among other text, numbers, markings, or images. In some aspects, transaction card 100 lacks any indicia 116 so that transaction card 100 appears as a solid color or shows only a pattern or design applied to transaction card 100. Eliminating indicia 116, such as personal information or account information from transaction card 100, can help to prevent identity theft and copying of personal information from transaction cards 100 by unauthorized users. Further, eliminating indicia 116 from transaction card 100 provides transaction card 100 with a simple and unique visual appearance. In such aspects lacking indicia 116, virtual card numbers and information can be generated for each transaction using software in conjunction with transaction card 100, as will be appreciated by a person having ordinary skill in the art.

Figure 4:
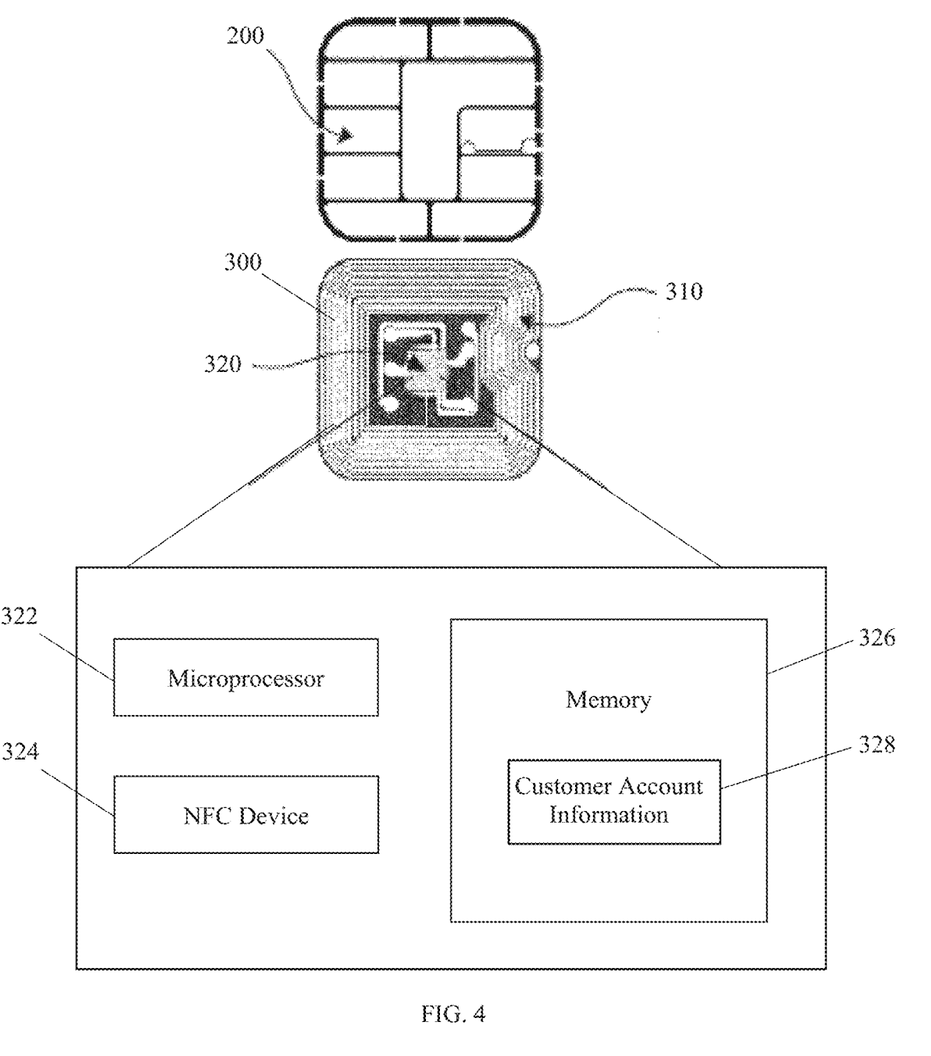
FIG. 4 shows a contact pad and a chip of a transaction card according to various aspects.

In addition to or alternatively, transaction card 100 can include one or more integrated chips (e.g., EMV chips), such as chip 300 (FIG. 4). With reference to FIGS. 3-4, chip 300 can include processing circuitry 320 having a microprocessor 322, a NFC device 324, and a memory 326, which can store account information 328.

In some aspects, chip 300 can be disposed beneath a contact pad 200. Accordingly, chip 300 can be disposed under top layer 110 in which a contact pad 200 is embedded. Chip 300 can be disposed between top layer 110 and bottom layer 150 such that chip 300 is secured within transaction card 100 and incapable of being extracted from either top layer 110 or bottom layer 150.

In some aspects, chip 300 can include an antenna 310 to couple chip 300 and its components to contact pad 200 behind which it is located. In some aspects, chip 300 can be coupled to contact pad 200 via a conductive wire or via another intervening structure. In some aspects, antenna 310 can be integral with processing circuitry 320. In some aspects, antenna 310 can be external to processing circuitry 320. In some aspects, antenna 310 can be used with a coil.

In some aspects, antenna 310 can additionally facilitate communication between chip 300 and an external card reader. In this way, the card reader can read account information 328 when coupled to contact pad 200 behind which chip 300 is located. When adjacent to the card reader, e.g., within about three inches or less of the card reader, antenna 310 can be energized by induction. Antenna 310 can send a signal to chip 300 such that processing circuitry 320 can detect a coupling between contact pad 200 behind which chip 300 is located and the external card reader. In some aspects, the signal can be in accordance with EMV protocol. In some aspects, the signal can indicate that the card reader is initiating a payment process with transaction card 100. Alternatively, transaction card 100 can be inserted into an external card reader. Contact pad 200 behind which chip 300 is located can then make an electrical connection with the card reader to transfer account information 328 from chip 300 and process a payment.

Memory 326 can store account information 328 and software for communicating with a bank or a credit service provider of a user. Account information 328 can include a customer identifier assigned to the user, which can be used to determine the identity of the user. Account information 328 can also identify an account of the user to facilitate payment from the identified account. In some aspects, account information 328 can identify transaction card 100. Accordingly, transaction card 100 and payment accounts associated with transaction card 100 can be identified together to facilitate payment from one or more payment accounts. Processing circuitry 320 can process information stored on memory 326 and communicate information to the card reader to facilitate a transaction when contact pad 200 behind which chip 300 is located is coupled to the card reader via antenna 310 or electrical connection. In this way, transaction card 100 can communicate with an external card reader. The communication can be via EMV protocol. Accordingly, multiple transactions of information can be completed to facilitate a payment. For example, EMV protocol may require authentication or other security measures. Account information 328 can facilitate authentication and payment processing.

In some aspects, NFC device 324 can communicate according to NFC protocol and can facilitate sharing of account information 328 to an NFC-enabled external device for payment processing. In some aspects, the NFC-enabled external device can be a card reader (e.g., a payment device, smartphone, computer, etc.). In some aspects, NFC device 324 can be coupled to antenna 310. In some aspects, antenna 310 can communicate according to NFC protocol. In some aspects, NFC device 324 is powered by the external device. In some aspects, NFC device 324 can be energized by a signal from the external device. In some aspects, transaction card 100 additionally or alternatively can include a power source to power NFC device 324. Accordingly, NFC device 324 can unilaterally energize its electromagnetic field.

As discussed above, top layer 110 can include one or more contact pads 200, such as first top contact pad 210 having contacts 212 and second top contact pad 220 having contacts 222. First top contact pad 210 can be disposed along first side 112 and second top contact pad 220 can be disposed along second side 114. Contacts 212 and contacts 222 can facilitate electrical coupling with another contact pad 200. Contacts 212 and contacts 222 can facilitate coupling between contact pads 200 and chip 300 regardless of whether chip 300 is disposed behind contact pad 200. Contacts 212 and contacts 222 can also facilitate electrical connection with card readers. In some aspects, contacts 212 and contacts 222 can be located according to the ISO/IEC 7816 standard to facilitate coupling with a card reader.

Figure 5:
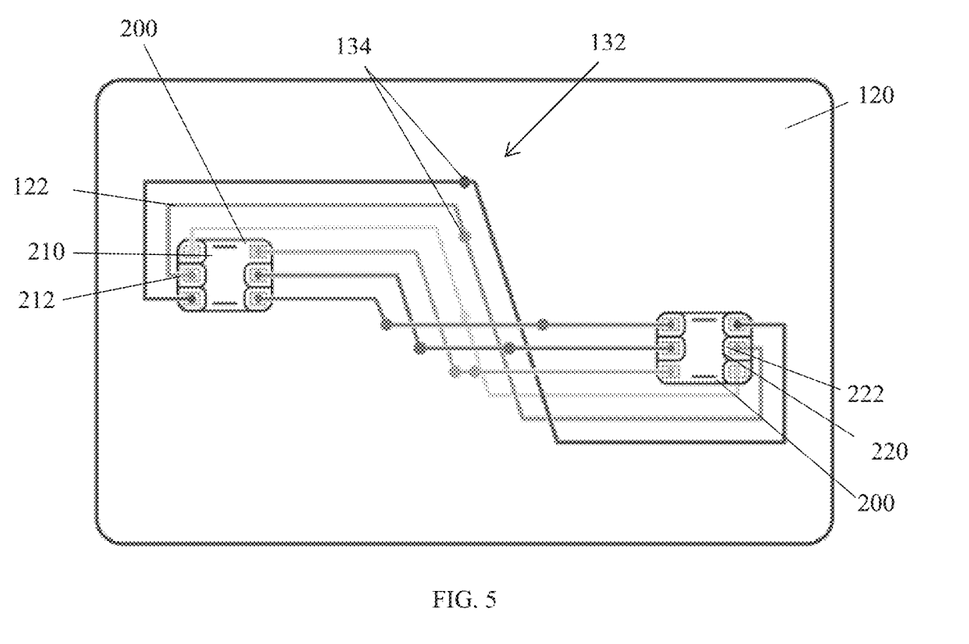
FIG. 5 shows an intermediate layer of a transaction card according to various aspects.

In some aspects, first top contact pad 210 and/or second top contact pad 220 can be located within one or more layers of transaction card 100. For example, first top contact pad 210 and/or second top contact pad 220 can be disposed within top layer 110 and first intermediate layer 120. As shown in FIG. 5, contacts 212 and contacts 222 can additionally or alternatively be disposed in first intermediate layer 120. First intermediate layer 120 can establish connection between first top contact pad 210 and second top contact pad 220 via contacts 212 and contacts 222. In some aspects, first intermediate layer 120 can include electrical tracing 122. Electrical tracing 122 can include bond wire, for example, to electrically connect different contact pads 200 and chip 300 (FIG. 4).

Figure 6:
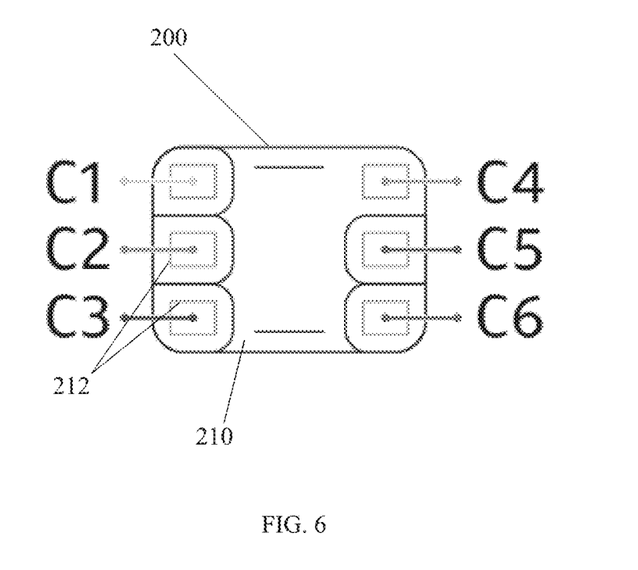
FIG. 6 shows a contact pad of the transaction card of FIG. 1.

As shown, in some aspects, electrical tracing 122 can connect contacts 212 and contacts 222. With reference to FIGS. 5-6, each contact pad 200 can include between approximately three and approximately eight contacts such as approximately six contacts. Accordingly, first top contact pad 210 can include six contacts 212 and second top contact pad 220 can include six contacts 222. Contacts 212 can be directly coupled to chip 300 (FIG. 4) disposed beneath first top contact pad 210. Contacts 222 can be indirectly coupled to chip 300 (FIG. 4) by coupling with contacts 212. In this way, a single chip 300 (FIG. 4) can be electrically connected to both first top contact pad 210 and second top contact pad 220 and thus can provide the same account information 328 via connection with first top contact pad 210 or second top contact pad 220.

When inserted into an external card reader, electrical tracing 122 can send a signal to chip 300 such that processing circuitry 320 (FIG. 4) can detect an electrical coupling between contact pad 200 and the external card reader. In some aspects, processing circuitry 320 (FIG. 4) can detect which contact pad 200 (e.g., first top contact pad 210, second top contact pad 220, first bottom contact pad 230, or second bottom contact pad 240) is coupled to the external card reader. Electrical tracing 122 coupled to contact pad 200 electrically connected to the external card reader can send a signal to processing circuitry 320. Accordingly, processing circuitry 320 can detect which contact pad 200 is coupled to the external card reader and can communicate information to the card reader via the coupled contact pad 200.

Figure 7:
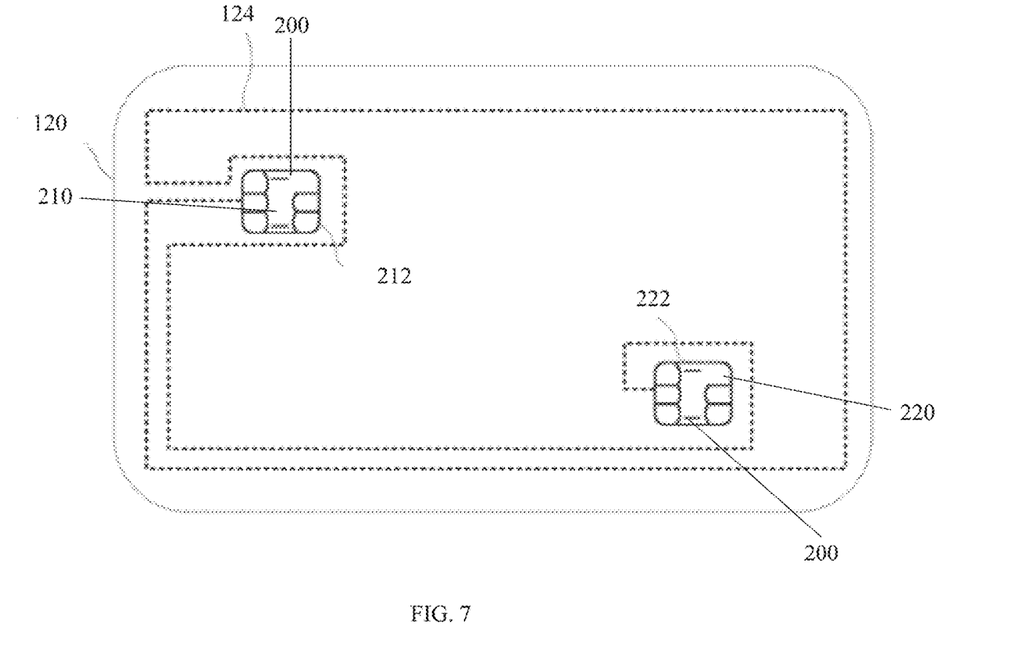
FIG. 7 shows a layer of a transaction card according to various aspects.

With reference to FIG. 7, in some aspects, transaction card 100 can include an antenna 124. In some aspects, antenna 124 can be embedded in transaction card 100. In some aspects, antenna 124 can be embedded in first intermediate layer 120. Antenna 124 may be coupled to antenna 310 (FIG. 4) and/or chip 300 (FIG. 4) to connect different contact pads 200 and chip 300 (FIG. 4). In some aspects, antenna 124 can be external to contact pads 200. As shown, antenna 124 can connect contacts 212 and contacts 222. One end of antenna 124 can be physically coupled to a contact 212 and another end of antenna 124 can be physically coupled to chip 300 (FIG. 4). Similarly, one end of antenna 124 can be physically coupled to a contact 222 and another end of antenna 124 can be physically coupled to chip 300 (FIG. 4). In some aspects, electrical tracing 122 (FIG. 5) and/or an antenna 124 can be used to electrically connect different contact pads 200 and chip 300 (FIG. 4).

As with antenna 310 (FIG. 4), antenna 124 can facilitate wireless communication with an external card reader. In some aspects, NFC device 324 (FIG. 4) can be coupled to antenna 124. In some aspects, antenna 310 can communicate according to NFC protocol. When adjacent to the card reader, e.g., within about three inches or less of the card reader, antenna 124 can be energized by induction. Antenna 124 can send a signal to chip 300 such that processing circuitry 320 (FIG. 4) can detect a wireless coupling between antenna 124 and the external card reader. In some aspects, the signal can indicate that the card reader is initiating a payment process with transaction card 100. In some aspects, processing circuitry 320 (FIG. 4) can detect which antenna 124 (e.g., antenna 124 coupled to first top contact pad 210, second top contact pad 220, first bottom contact pad 230, or second bottom contact pad 240) is coupled to the external card reader. Antenna 124 coupled to contact pad 200 proximate to the external card reader can send a signal to processing circuitry 320. Accordingly, processing circuitry 320 can detect which antenna 124 is coupled to the external card reader and can communicate information to the card reader via the coupled antenna 124.

Figure 8:
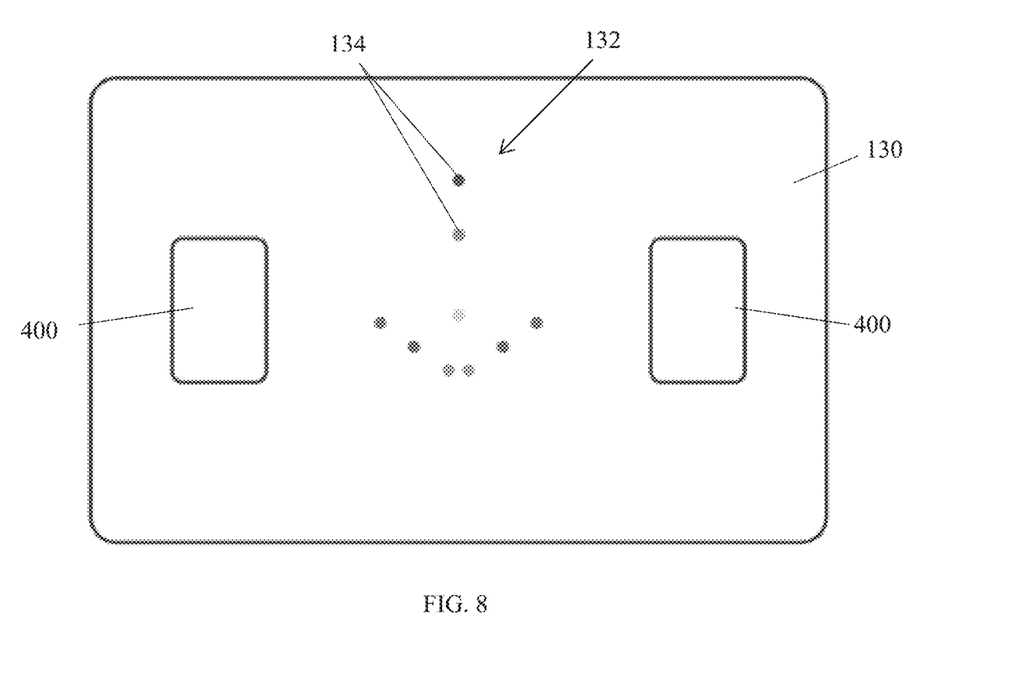
FIG. 8 shows a layer of a transaction card according to various aspects.

Rather than physically isolating contact pads 200 and providing separate connections to a chip 300 (FIG. 4), first intermediate layer 120, middle layer 130 (FIG. 1), and second intermediate layer 140 (FIG. 1) facilitate interconnection and a central connection junction such that chip 300 is simultaneously electrically connected to each contact pad 200. In some aspects, chip 300 (FIG. 4), electrical tracing 122 (FIG. 5), and/or antenna 124 can be disposed in the same or different layers (e.g., top layer 110, first intermediate layer 120, middle layer 130, second intermediate layer 140, or bottom layer 150). In some aspects, these components disposed in different layers can facilitate electric coupling between chip 300 (FIG. 4) and contact pads 200, and wireless and/or electric coupling with an external card reader. As shown in FIG. 8, middle layer 130 can be the central junction. Middle layer 130 can include a junction 132 having one or more junction points 134. Contacts 212 and contacts 222 can be electrically connected to each other through junction points 134 such that first top contact pad 210 and second top contact pad 220 are provided an electrical connection to the same chip. In other words, through junction points 134, contacts 222 of second top contact pad 220 are coupled to contacts 212 of first top contact pad 210 such that second top contact pad 220 is coupled to chip 300 (FIG. 4), where chip 300 (FIG. 4) is directly coupled to first top contact pad 210.

Accordingly, a user can insert transaction card 100 into a card reader with top layer 110 (FIG. 1) facing up via either first side 112 (FIG. 1) or second side 114 (FIG. 1) to couple chip 300 (FIG. 4) with the card reader via the contact pads. Chip 300 (FIG. 4) can provide the same account information 328 (FIG. 4) to the card reader via connection with either first top contact pad 210 or second top contact pad 220 such that it does not matter which side (e.g., first side 112 (FIG. 1) or second side 114 (FIG. 1)) is inserted into the card reader.

Figure 9:
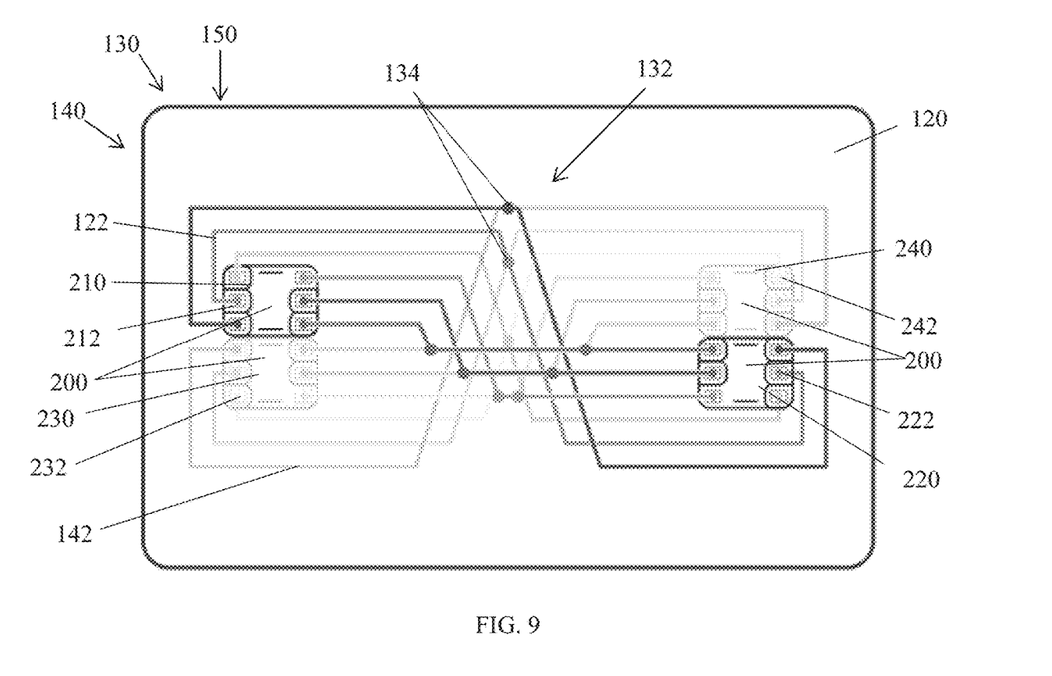
FIG. 9 shows a layer of a transaction card according to various aspects.
Figure 10:
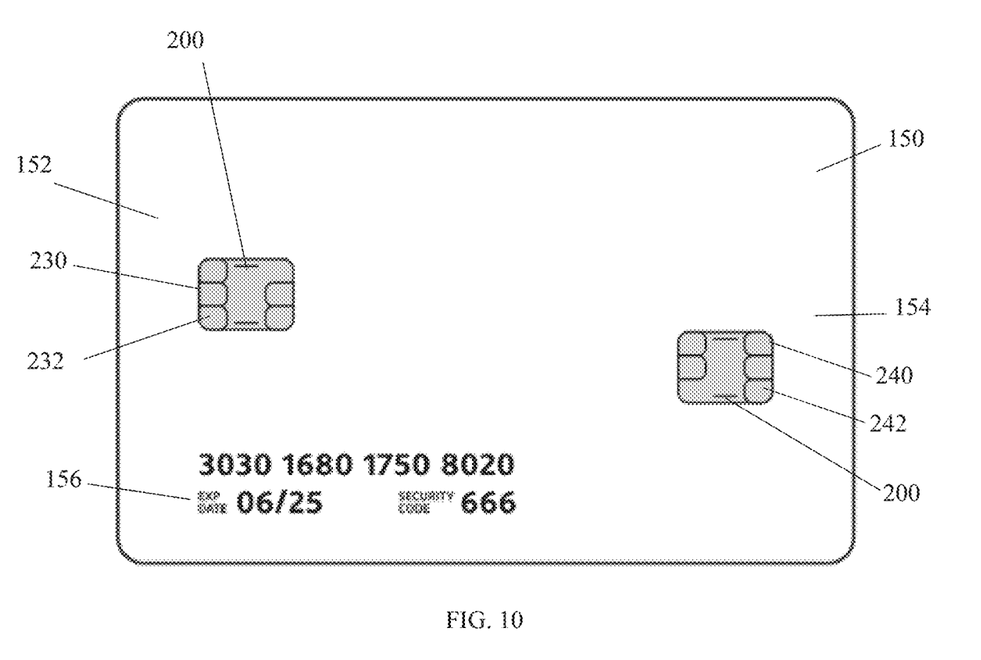
FIG. 10 shows a bottom view of the transaction card of FIG. 1.

Similarly, a user can insert transaction card 100 into a card reader with bottom layer 150 (FIG. 1) facing up to couple chip 300 (FIG. 4) with the card reader. With reference to FIGS. 9-10, bottom layer 150 can include a first side 152 and a second side 154 opposite first side 152. As shown in FIG. 10, one or more contact pads 200 can be embedded within bottom layer 150, such as along first side 152 and/or second side 154. In some aspects, bottom layer 150 can include one or more contact pads 200, such as a first bottom contact pad 230 having contacts 232 and a second bottom contact pad 240 having contacts 242. First bottom contact pad 230 can be disposed along first side 152 and second bottom contact pad 240 can be disposed along second side 154. In some aspects, bottom layer 150 can include additional contact pads 200. In some aspects, bottom layer 150 can include indicia 156. Indicia 156 can be applied to bottom layer 150 at a different location than the locations where first bottom contact pad 230 and second bottom contact pad 240 are disposed. Indicia 156 can be formed in the same way as indicia 116 (FIG. 3) discussed above. In some aspects, bottom layer 150 can include a magnetic stripe. The magnetic stripe can be applied to bottom layer 150 at a different location than the locations where first bottom contact pad 230 and second bottom contact pad 240 are disposed.

In some aspects, first bottom contact pad 230 and/or second bottom contact pad 240 can be located within one or more layers of transaction card 100. For example, first bottom contact pad 230 and/or second bottom contact pad 240 can be disposed within bottom layer 150 and second intermediate layer 140. As shown in FIG. 9, contacts 232 and contacts 242 can additionally or alternatively be disposed in second intermediate layer 140. Second intermediate layer 140 can establish connection between first bottom contact pad 230 and second bottom contact pad 240 via contacts 232 and contacts 242. In some aspects, second intermediate layer 140 can include electrical tracing 142. Electrical tracing 142 can include bond wire, for example, to electrically connect different contact pads 200 and chip 300 (FIG. 4).

In some aspects, electrical tracing 142 can connect contacts 232 and contacts 242. As discussed above with reference to FIGS. 5-6, each contact pad 200 can include six contacts. Accordingly, first bottom contact pad 230 can include six contacts 232 and second bottom contact pad 240 can include six contacts 242. Contacts 232 and contacts 242 can be indirectly coupled to chip 300 (FIG. 4) like contacts 222 (FIG. 5) by coupling with contacts 212 (FIG. 5), which can be directly coupled to chip 300 (FIG. 4). In this way, a single chip 300 (FIG. 4) can provide the same account information 328 (FIG. 4) via both first bottom contact pad 230 and second bottom contact pad 240.

Additionally or alternatively, in some aspects, antenna 144 can be embedded in second intermediate layer 140. In some aspects, antenna 144 can be similar to antenna 124 (FIG. 7). Antenna 144 may be coupled to antenna 310 (FIG. 4) and/or chip 300 (FIG. 4) to connect different contact pads 200 and chip 300 (FIG. 4). In some aspects, antenna 144 can be external to contact pads 200. As shown, antenna 144 can connect contacts 232 and contacts 242. One end of antenna 144 can be physically coupled to a contact 232 and another end of antenna 124 can be physically coupled to chip 300 (FIG. 4). Similarly, one end of antenna 144 can be physically coupled to a contact 242 and another end of antenna 124 can be physically coupled to chip 300 (FIG. 4). In some aspects, electrical tracing 122 (FIG. 5) and/or an antenna 144 can be used to electrically connect different contact pads 200 and chip 300 (FIG. 4).

As with antenna 124 (FIG. 7) and antenna 310 (FIG. 4), antenna 144 can facilitate wireless communication with an external card reader. As with antenna 124 (FIG. 7), processing circuitry 320 can detect which antenna 144 is coupled to the external card reader and can communicate information to the card reader via the coupled antenna 144.

In some aspects, chip 300 (FIG. 4), electrical tracing 122 (FIG. 5), electrical tracing 142, antenna 124, and/or antenna 144 can be disposed in the same or different layers (e.g., top layer 110, first intermediate layer 120, middle layer 130, second intermediate layer 140, or bottom layer 150). In some aspects, these components disposed in different layers can facilitate electric coupling between chip 300 (FIG. 4) and contact pads 200, and wireless and/or electric coupling with an external card reader.

First intermediate layer 120, middle layer 130, and second intermediate layer 140 facilitate interconnection and a central connection junction such that chip 300 is simultaneously electrically connected to each contact pad 200, including first bottom contact pad 230 and second bottom contact pad 240. As with contacts 212 and contacts 222, contacts 232 and contacts 242 can be electrically connected to each other through junction points 134 of junction 132 on middle layer 130 such that first bottom contact pad 230 and second bottom contact pad 240 are provided an electrical connection to the same chip. In addition, at least one of contacts 212 and contacts 222 can be electrically connected to one or more of contacts 232 and contacts 242 to provide an electrical connection to the same chip with contacts 212, contacts 222, contacts 232, and contacts 242. For example, both contacts 232 and contacts 242 can be electrically connected to contacts 232. Additionally or alternatively, both contacts 232 and contacts 242 can be electrically connected to contacts 222, which can be electrically connected to contacts 212. Through junction points 134, contacts 232 of first bottom contact pad 230 and contacts 242 of second bottom contact pad 240 are electrically coupled to contacts 212 of first top contact pad 210 and contacts 222 of second top contact pad 220. First bottom contact pad 230 and second bottom contact pad 240 can thus be electrically coupled to chip 300 (FIG. 4), where chip 300 (FIG. 4) can be directly electrically coupled to first top contact pad 210.

Transaction card 100 can be orientationless because junction 132 of middle layer 130 can electrically connect contact pads 200 of transaction card 100, e.g., first top contact pad 210, second top contact pad 220, first bottom contact pad 230, and second bottom contact pad 240. In other words, first top contact pad 210 and second top contact pad 220 are electrically connected to first bottom contact pad 230 and second bottom contact pad 240 via first intermediate layer 120, middle layer 130, and second intermediate layer 140 and vice versa. The stacked layers and connection methods provide each contact pad 200 an electrical connection to the same chip.

In some aspects, one or more of first intermediate layer 120, middle layer 130, and second intermediate layer 140 can include openings to prevent covering a contact pad 200 to facilitate connection and provide an electrical connection to the same chip. Openings can be located adjacent to a contact pad 200. In some aspects, middle layer 130 includes openings 400 (FIG. 8) to facilitate connection between contact pads 200 disposed in top layer 110 and bottom layer 150. In some aspects, an opening can be disposed in first intermediate layer 120 adjacent to a contact pad 200 disposed in top layer 110. In some aspects, first intermediate layer 120 can include a first opening such that first top contact pad 210 extends through the first opening. In some aspects, first intermediate layer 120 can include a second opening such that second top contact pad 210 extends through the second opening. An opening can be disposed in middle layer 130 adjacent to the openings on first intermediate layer 120 and contact pads 200 disposed in top layer 110. Additionally, second intermediate layer 140 can include openings adjacent to the openings on first intermediate layer 120, middle layer 130, and contact pads 200 disposed in top layer 110. As with contact pads 200 in top layer 110, contact pads 200 can be disposed in bottom layer 150 adjacent to the openings. In this way, contact pads 200 disposed in top layer 110 and bottom layer 150 can be connected to junction 132 of middle layer 130 and/or to each other. In some aspects, second intermediate layer 140 can include a first opening such that the first bottom contact pad 230 extends through the first opening. Second intermediate layer 140 can include a second opening such that the second bottom contact pad 240 extends through the second opening.

Accordingly, a user can insert transaction card 100 into a card reader with top layer 110 (FIG. 1) facing up via either first side 152 (FIG. 1) or second side 154 (FIG. 1) to couple chip 300 (FIG. 4) with the card reader via a respective contact pad. Additionally, with reference to FIG. 10, a user can insert transaction card 100 into a card reader with bottom layer 150 facing up via either first side 152 or second side 154 to couple chip 300 (FIG. 4) with the card reader. Chip 300 (FIG. 4) can provide the same account information 328 (FIG. 4) to the card reader via both first bottom contact pad 230 and second bottom contact pad 240 such that it does not matter which side (e.g., first side 152 or second side 154) is inserted.

With reference to FIG. 9, it should be understood that while reference is made to chip 300 (FIG. 4) being directly coupled to first top contact pad 210 (FIG. 9), chip 300 (FIG. 4) can be directly coupled to one or more contact pads 200, e.g., first top contact pad 210, second top contact pad 220, first bottom contact pad 230, and/or second bottom contact pad 240 via the connection methods discussed above.

Additionally, in some aspects, each contact pad 200 of transaction card 100 can be connected to a separate chip 300 (FIG. 4). Thus, first top contact pad 210 can be connected to a first chip 300 (FIG. 4), second top contact pad 220 can be connected to a second chip 300 (FIG. 4), first bottom contact pad 230 can be connected to a third electronic chip 300 (FIG. 4), and second bottom contact pad 240 can be connected to a fourth chip 300 (FIG. 4). In some aspects, at least one contact pad 200 can be connected to a separate chip 300 (FIG. 4). Therefore, two contact pads 200 or three contact pads 200 can be connected to a separate chip 300 (FIG. 4). Each separate chip 300 (FIG. 4) can be associated with the same payment account of the user, or different payment accounts of the user.

Figure 11:
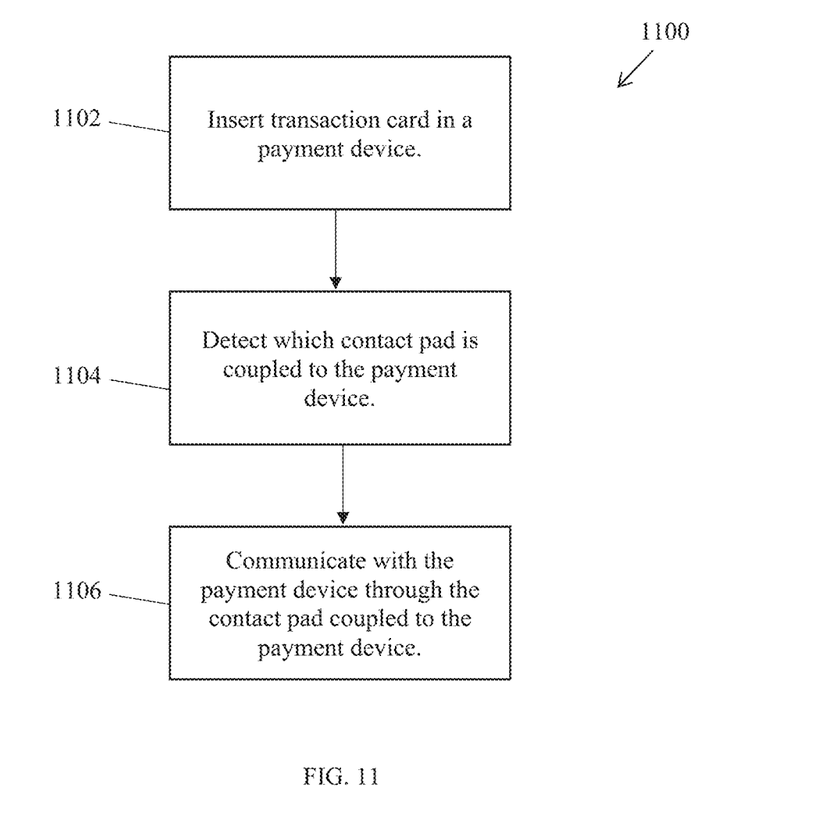
FIG. 11 shows an exemplary method of using a transaction card according to various aspects.

Some aspects described herein relate to a method of using transaction card 100, as shown in FIG. 11. In step 1102, a user can insert transaction card 100 in a card reader. Transaction card 100 can be orientationless as each contact pad 200 disposed in transaction card 100 can be electrically connected to each other and coupled to chip 300. For example, a contact pad 200 coupled to chip 300 can be disposed in top layer 110 and can be electrically connected to other contact pads 200 disposed in top layer 110 and contact pads 200 disposed in bottom layer 150 via first intermediate layer 120, middle layer 130, and second intermediate layer 140 to provide an electrical connection to the same chip. Accordingly, a user can insert transaction card 100 into a card reader with top layer 110 facing up via either first side 152 or second side 154 to couple chip 300 with the card reader. Additionally, a user can insert transaction card 100 into a card reader with bottom layer 150 facing up via either first side 152 or second side 154 to couple chip 300 with the card reader. Chip 300 can provide the same account information 328 to the card reader via both first bottom contact pad 230 and second bottom contact pad 240 such that it does not matter which side (e.g., first side 152 or second side 154) is inserted.

In step 1104, transaction card 100 can detect which contact pad 200 is coupled to the card reader. Chip 300 can include an NFC device 324 that is powered by the card reader (e.g., via an electromagnetic field initiated by the card reader). In addition, contact pad 200 communicates with the card reader when adjacent to the card reader, e.g., within about three inches or less of the card reader. Once a contact pad 200 is adjacent to the card reader, contact pad 200 can be wirelessly coupled to the card reader to facilitate communication.

In step 1106, transaction card 100 can communicate with the card reader through contact pad 200 coupled to the card reader. When coupled to the card reader, contact pad 200 can transfer account information 328 from chip 300 and process a payment. Account information 328 and software for communicating with a bank or a credit service provider of a user can be stored in memory 326 of chip 300. For example, memory 326 can store a customer identifier assigned to the user, which can be used to determine the identity of the user. Account information 328 can also identify an account of the user to facilitate payment from the identified account. In some aspects, account information 328 can identify transaction card 100. Accordingly, transaction card 100 and payment accounts associated with transaction card 100 can be identified together to facilitate payment from one or more payment accounts.

It should be understood that although reference is made to first top contact pad 210, second top contact pad 220, first bottom contact pad 230, and second bottom contact pad 240, transaction card 100 described herein can include one or more contact pads 200. For example transaction card 100 can include between approximately one and approximately eight contact pads 200, such as between approximately two and approximately six contact pads 200, such as approximately three contact pads 200 or approximately four contact pads 200. Accordingly, transaction card 100 can include an odd number of contact pads 200 or an even number of contact pads 200. Additional contact pads 200 can be included to increase the number of permutations in which transaction card 100 can be inserted into a card reader. In addition, it should be understood that although reference is made to top layer 110 and bottom layer 150 each including two contact pads 200, top layer 110 and bottom layer 150 can each include one or more contact pads 200. Top layer 110 and bottom layer 150 can include a different number of contact pads 200 as well. For example, top layer 110 can include one contact pad 200 while bottom layer 150 can include two contact pads 200. In this way, the number of permutations in which transaction card 100 can be inserted into a card reader can be customized.

It is to be appreciated that the Detailed Description section, and not the Summary and Abstract sections, is intended to be used to interpret the claims. The Summary and Abstract sections can set forth one or more but not all exemplary aspects of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the invention that others can, by applying knowledge within the skill of the art, readily modify and/or adapt for various applications such specific aspects, without undue experimentation, without departing from the general concept of the present invention. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary aspects, but should be defined only in accordance with the following claims and their equivalents.

What is claimed is:

1. A transaction card, comprising:
a top layer with a first contact pad located in the top layer;
a bottom layer with a second contact pad disposed in the bottom layer;
a first intermediate layer disposed under the top layer;
a second intermediate layer disposed above the bottom layer;
a middle layer disposed between the first intermediate layer and the second intermediate layer;
the middle layer further comprising an electrical junction including at least one junction point to contact the top layer and the bottom layer;
wherein the electrical junction connects the second contact pad to the first contact pad via the first intermediate layer, the second intermediate layer, and the middle layer through the electrical junction; and
an EMV chip comprising processing circuitry and a memory, the chip disposed between the top layer and the bottom layer and coupled to at least one of the first contact pad and the second contact pad such that the first contact pad and the second contact pad process account information stored in the memory to communicate with a card reader.

2. The transaction card of claim 1, wherein the first intermediate layer comprises electrical tracing to electrically connect the first contact pad and the second contact pad.

3. The transaction card of claim 1, wherein the second intermediate layer comprises electrical tracing to electrically connect the first contact pad and the second contact pad.

4. The transaction card of claim 1, wherein the first intermediate layer comprises an antenna to electrically couple the chip to the first contact pad and the second contact pad.

5. The transaction card of claim 1, wherein the second intermediate layer comprises an antenna to electrically couple the chip to the first contact pad and the second contact pad.

6. The transaction card of claim 1, wherein the middle layer comprises an antenna to electrically couple the chip to the first contact pad and the second contact pad.

7. The transaction card of claim 1, wherein the processing circuitry detects which of the first contact pad and the second contact pad is coupled to the card reader.

8. The transaction card of claim 1, wherein the processing circuitry communicates with the card reader through the first contact pad or the second contact pad.

9. The transaction card of claim 1, wherein the first intermediate layer comprises an opening such that the first contact pad extends through the opening.

10. The transaction card of claim 1, wherein the second intermediate layer comprises an opening such that the second contact pad extends through the opening.

11. A transaction card, comprising:

contact pads comprising:
- a first contact pad comprising electrical contacts and disposed in a top layer of the transaction card, and
- a second contact pad comprising electrical contacts and disposed in a bottom layer of the transaction card;

an EMV chip comprising processing circuitry and a memory, the chip disposed between the top layer and the bottom layer and coupled to at least one of the contact pads such that each of the contact pads is electrically connected to the other of the contact pads and communicates account information stored in the memory to a card reader; and a junction comprising junction points and disposed in a middle layer of the transaction card between the top layer and the bottom layer, the electrical contacts of each of the contact pads electrically connected to each other through the junction points such that each of the contact pads provide an electrical connection to the same chip.

12. The transaction card of claim 11, further comprising:
electrical tracing in a first intermediate layer of the transaction card between the top layer and the middle layer; and
electrical tracing in a second intermediate layer of the transaction card between the bottom layer and the middle layer,
wherein the electrical tracing in the first intermediate layer and the electrical tracing in the second intermediate layer connect the electrical contacts of the contact pads to the junction points.

13. The transaction card of claim 11, further comprising:
electrical tracing in an intermediate layer of the transaction card between the top layer and the middle layer,
wherein the electrical tracing connects the electrical contacts of the first contact pad and the second contact pad.

14. The transaction card of claim 11, further comprising:
electrical tracing in an intermediate layer of the transaction card between the bottom layer and the middle layer,
wherein the electrical tracing connects the electrical contacts of the first contact pad and the second contact pad.

15. The transaction card of claim 11, wherein the processing circuitry detects which of the contact pads are coupled to the card reader and communicates with the card reader through the contact pad coupled to the card reader.

16. The transaction card of claim 11, further comprising:
an antenna to couple the chip to the contact pads.

17. A method of manufacturing a transaction card, the method comprising:
providing a top layer with a first contact pad disposed in the top layer;
providing a bottom layer with a second contact pad disposed in the bottom layer;
providing a first intermediate layer disposed under the top layer;
providing a second intermediate layer disposed above the bottom layer;
providing a middle layer disposed between the first intermediate layer and the second intermediate layer, the middle layer comprising an electrical junction including at least one junction prior to connect the top layer and the bottom layer via the first intermediate layer, the second intermediate layer, and the middle layer; and
disposing an EMV chip between the top layer and the bottom layer, the chip coupled to at least one of the first contact pad and the second contact pad and comprising processing circuitry and a memory such that the first contact pad and the second contact pad process account information stored in the memory to communicate with a card reader.

18. The transaction card of claim 1, further comprising four contact points.

* * * * *